United States Patent [19]

Winter

[11] 4,320,805

[45] Mar. 23, 1982

[54] WING FOLD IMPLEMENT AND FOLDING SEQUENCE CONTROL THEREFOR

[75] Inventor: David C. Winter, Des Moines, Iowa

[73] Assignee: Deere & Company, Moline, Ill.

[21] Appl. No.: 171,591

[22] Filed: Jul. 23, 1980

[51] Int. Cl.$^3$ .............................................. A01B 73/00
[52] U.S. Cl. ..................... 172/776; 91/532; 172/456
[58] Field of Search ............... 172/2, 126, 130, 225, 172/243, 294, 311, 328, 421, 446, 456, 662, 776, 466; 56/228, 385; 91/27, 170 R, 170 MP, 183, 185, 520, 532

[56] References Cited

U.S. PATENT DOCUMENTS

| | | | |
|---|---|---|---|
| 2,940,262 | 6/1960 | Pfitzenmeier | 91/532 X |
| 4,030,551 | 6/1977 | Boetto et al. | 172/126 |
| 4,046,203 | 9/1977 | Ward | 172/456 |
| 4,151,886 | 5/1979 | Boetto et al. | 172/311 |
| 4,207,951 | 6/1980 | Wilcox et al. | 172/225 |

*Primary Examiner*—Richard T. Stouffer

[57] ABSTRACT

A hydraulic control for a folding tool bar which has a transport width less than half the field working width. Restrictors are added in series in the right-hand folding lines to cause the left-hand outrigger to fold to the transport position first. A one-way plunger operated ball check valve located in the hinge area between the main frame and an outrigger frame bypasses the restrictors for the first five degrees of fold and for the complete unfold cycle. The outriggers can therefore be lifted together at the start of the fold cycle during turns in the headlands. For complete folding to the transport position the left-hand outrigger folds first with the end of the right-hand outrigger positioned above it. The ball check valve causes the right-hand outrigger to unfold out of the path of the left-hand outrigger during the unfolding cycle.

40 Claims, 8 Drawing Figures

WING FOLD IMPLEMENT AND FOLDING SEQUENCE CONTROL THEREFOR

BACKGROUND OF THE INVENTION

The present invention relates generally to a folding toolbar and more specifically to a hydraulic sequence control for folding the outrigger frames on a toolbar.

As tractors are made larger and farms increase in size, farm implements are widened to cover a larger swath during each pass through the field. Transporting implements continues to be a source of difficulty since the transport width must be sufficiently narrow to pass through gates and over bridges and public roads and the like. Folding toolbars have been devised with a main frame having a pair of outrigger frames hinged to its ends for folding upwardly about a horizontal pivot to a narrow transport position. When the outrigger frames have a combined width less than the width of the main frame, they can be folded together approximately 180° to a position directly over the main frame. However, a problem exists when it is desirable to have an implement transport width less than half the field work width, since both outriggers cannot fold 180° without interference from each other. Commonly each of the outriggers is folded slightly more than 90° so that it projects upwardly and just inside the main frame. This arrangement does not provide as compact and stable transport configuration as one with outriggers which fold approximately 180°.

Heretofore it was not practical to add extensions to the 180° fold outrigger frames, for example to increase row crop cultivator width from 16 to 18 rows, because the extensions would interfere with each other when the outriggers were folded between the transport and field-working positions. To add outrigger extensions to an existing 180° wing fold arrangement would require a new or extensively revised hydraulic folding system.

When turning in the headlands with a tractor mounted wingfold toolbar, it is often desirable to activate the hydraulic folding system and lift to outriggers approximately 5° to prevent the outer ends of the implement from contacting the ground during the turn. Previously available hydraulic systems for raising the outriggers included specially designed dual function cylinders for operating in one mode during turns and in another mode during folding and unfolding of the outriggers between the transport and field-working positions. These cylinders are more complex and expensive than other types of cylinders utilized for folding and unfolding the outriggers.

It is therefore an object of the present invention to provide an improved hydraulic folding system for wing-fold implements.

It is another object of the invention to provide a relatively inexpensive and simple folding sequence control for wing-fold implements.

It is yet another object to provide an improved hydraulic system for folding a wing-fold implement to less than half its field-working width while providing a relatively low, stable transport configuration.

It is a further object to provide a simple and yet reliable control for raising the outriggers of a folding toolbar together during the first portion of the fold cycle and thereafter sequencing the folding to provide the desired movement of the outriggers to and from the transport position so they do not interfere with each other. It is also an object to provide such a control which does not require special hydraulic cylinders or more than one hydraulic outlet.

It is a further object of the invention to provide a control which can be added to an existing 180° folding toolbar to permit the outriggers to be extended to a total combined width greater than the width of the main frame while preventing interference between the outriggers during folding and unfolding, and while causing the outriggers to fold in unison for the first part of the fold cycle.

The first outrigger of a 180° folding toolbar is folded to a 180° position first after which the second outrigger is folded to about a 150° position where it is supported just above the end of the first outrigger. Restrictors are added in series to the hydraulic line for the second outrigger cylinder. A one-way plunger operated ball check valve bypasses the restrictors for the first 5° of fold. The check valve is located on the main frame in the hinge area and is operated by an arm on the outrigger. In the field-working position of the toolbar, the plunger is depressed so that when hydraulic pressure is applied to the cylinders the outriggers raise together for the first 5°. At this point, the plunger closes the check valve to slow the folding of the second outrigger. During unfolding the check valve allows the hydraulic fluid to bypass the restrictors so the first and second outriggers unfold at the same speed, thus insuring that the second outrigger will be out of the way of the first outrigger. This arrangement permits the total width of the outriggers to be greater than the width of the main frame, and provides a simple and yet reliable means for raising the outriggers together during the first portion of the fold cycle.

These and other objects, features and advantages of the present invention will become apparent to those skilled in the art upon a reading of the following detailed description taken with the accompanying drawings.

DESCRIPTION OF THE PREFERRED EMBODIMENT

Figure 1:
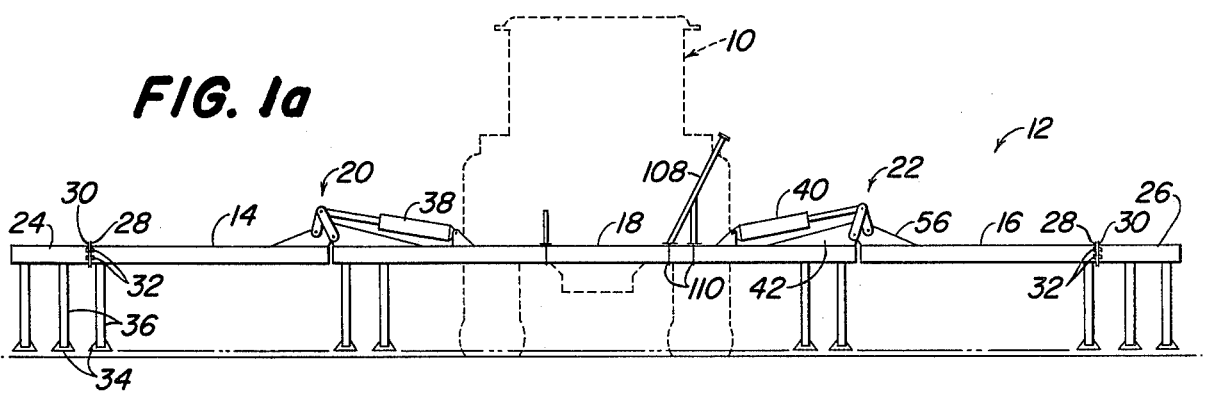
FIG. 1a is a rear view of a wing-fold toolbar embodying the present invention mounted on a tractor and in the field-working position.
FIG. 1b is a view similar to FIG. 1a but showing the outriggers raised together to an intermediate position approximately 5° above the horizontal.
FIG. 1c is a view similar to FIG. 1a but showing the outriggers folded approximately midway between the field-working and the transport positions.
FIG. 1d is also a view similar to FIG. 1a but showing the outriggers in the transport position.

Referring to the drawings, in FIG. 1 there is shown a tractor 10 supporting a 180° folding toolbar from a 3-point hitch or the like (not shown) for vertical movement with respect to the ground. A rear lift assist wheel (not shown) can be attaced to the toolbar if necessary for added support and lifting capacity. The toolbar 12 is generally of a conventional design with first and second outrigger frames 14 and 16 pivotally connected to a main frame 18 at its left and right ends by hinges 20 and 22, respectively. Such a toolbar is commercially available, for example with the John Deere model 85 Row Crop Cultivator. However, the toolbar 12 has been lengthened by connecting extensions 24 and 26 to the ends of the outrigger frames 14 and 16 so that the total width of the outrigger frames is greater than the width of the main frame 18. Plates 28 and 30 are welded to the ends of the outrigger frames 14 and 16 and to the innermost ends of the extensions 24 and 26 and are connected together by bolts 32, or other suitable conventional means are utilized to add the extensions 24 and 26. The extensions 24 and 26 may also be formed as integral parts of the outrigger frames. Ground-working tools 34 such as cultivator shovels are supported from the toolbar 12 by shank assemblies 36. The extensions 24 and 26 are added, for example, to convert a conventional 16-row cultivator into an 18-row cultivator.

Hydraulic cylinders 38 and 40 are connected to their rod ends to the hinges 20 and 22, respectively, and at the opposite ends to the main frame 18. The cylinders are connected to a source of hydraulic pressure P at a hydraulic outlet on the tractor 10, and are extendable and retractable to move the outriggers between the unfolded field-working position (FIG. 1a) and the folded transport position (FIG. 1d). In the preferred embodiment, cylinders 38 and 40 are essentially identical and have equal displacement.

Figure 3:
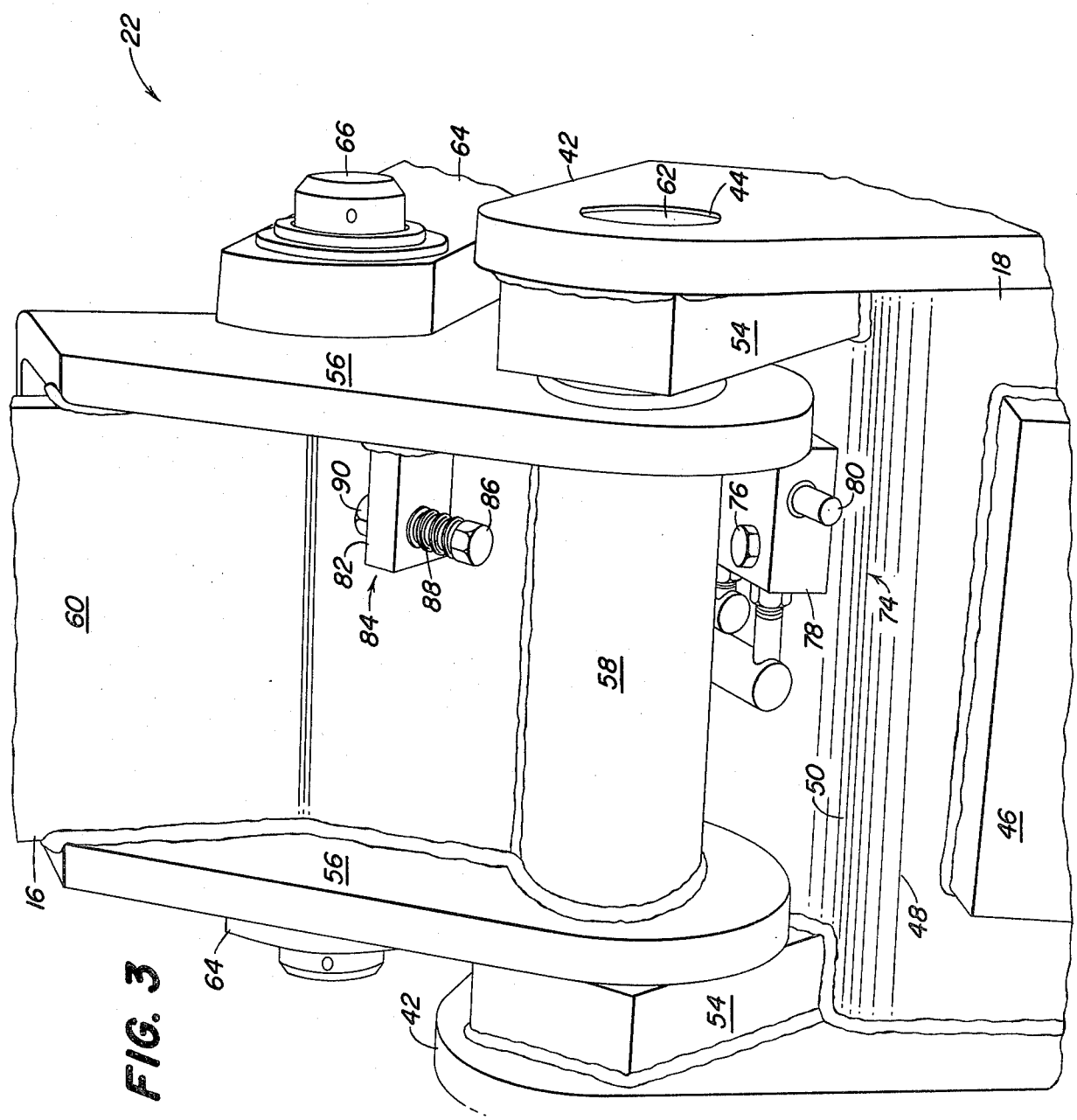
FIG. 3 is an end perspective view of the right-hand outrigger hinge areas, with the outrigger in the position shown in FIG. 1d, and showing the valve operating arm and the check valve with the plunger released.
Figure 5:
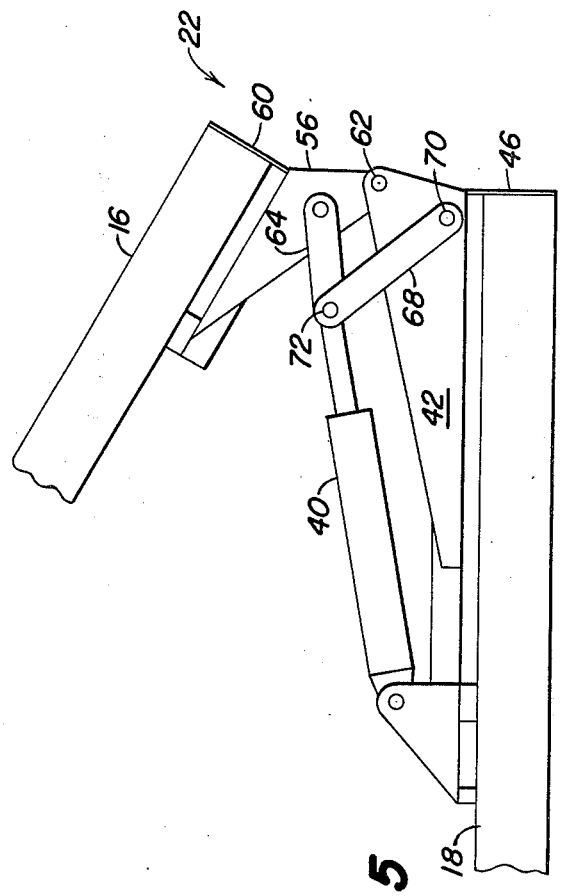
FIG. 5 is an enlarged rear view of the right-hand hinge in the position shown in FIG. 1d.

The hinges 20 and 22 are substantially identical so only the right-hand hinge 22 will be described in detail. Side brackets 42 extend upwardly from the main frame 18 and include apertures 44 (FIG. 3) laterally outwardly of main frame end wall 46. A connecting portion 48 is welded to the side brackets 42 and to the end wall 46. The portion 48 extends vertically from the end wall 46 and inwardly in a substantially horizontal attitude from bend location 50, terminating at a wall 52. A reinforcing spacer 54 is welded on each side of the hinge 22 to the side brackets 42 and the connecting portion 48.

The hinge 22 also includes side brackets 56 which extend upwardly from the outrigger frame 16 and inside the main frame side brackets 42. The brackets 56 extend laterally from the end of the outrigger frame 16 toward the main frame 18. A tubular member 58 is welded between the side brackets 56. The outrigger frame end plate, indicated generally at 60 is welded to the side brackets 56 and the tubular member 58. A hinge pin 62 is inserted through the apertures 44, spacers 54 and tubular member 58 to pivotally connect the outrigger 16 for rocking with respect to the main frame 18 about the generally horizontal and fore-and-aft extending axis of the hinge pin.

Links 64 are pivotally connected at one end to the outrigger brackets 56 by a pivot pin 66. Links 68 (FIG. 1b) are connected at one end to the main frame brackets 42 by a pivot pin 70. The opposite ends of the links 64 and 68 are pivotally connected together and to the rod end of the cylinder 40 by a pin 72, so that as the cylinder 40 is retracted the outrigger 16 will be pivoted about the axis of the pin 62 in the counterclockwise direction as viewed in FIGS. 1a–1d and 5. As the cylinder is extended, the outrigger 16 will pivot in the clockwise direction. Construction and operation of the left-hand hinge 20 is substantially identical to that of the right-hand hinge 22. Such hinges are the same as provided on the aforementioned model 85 Row Crop Cultivator.

Figure 2:
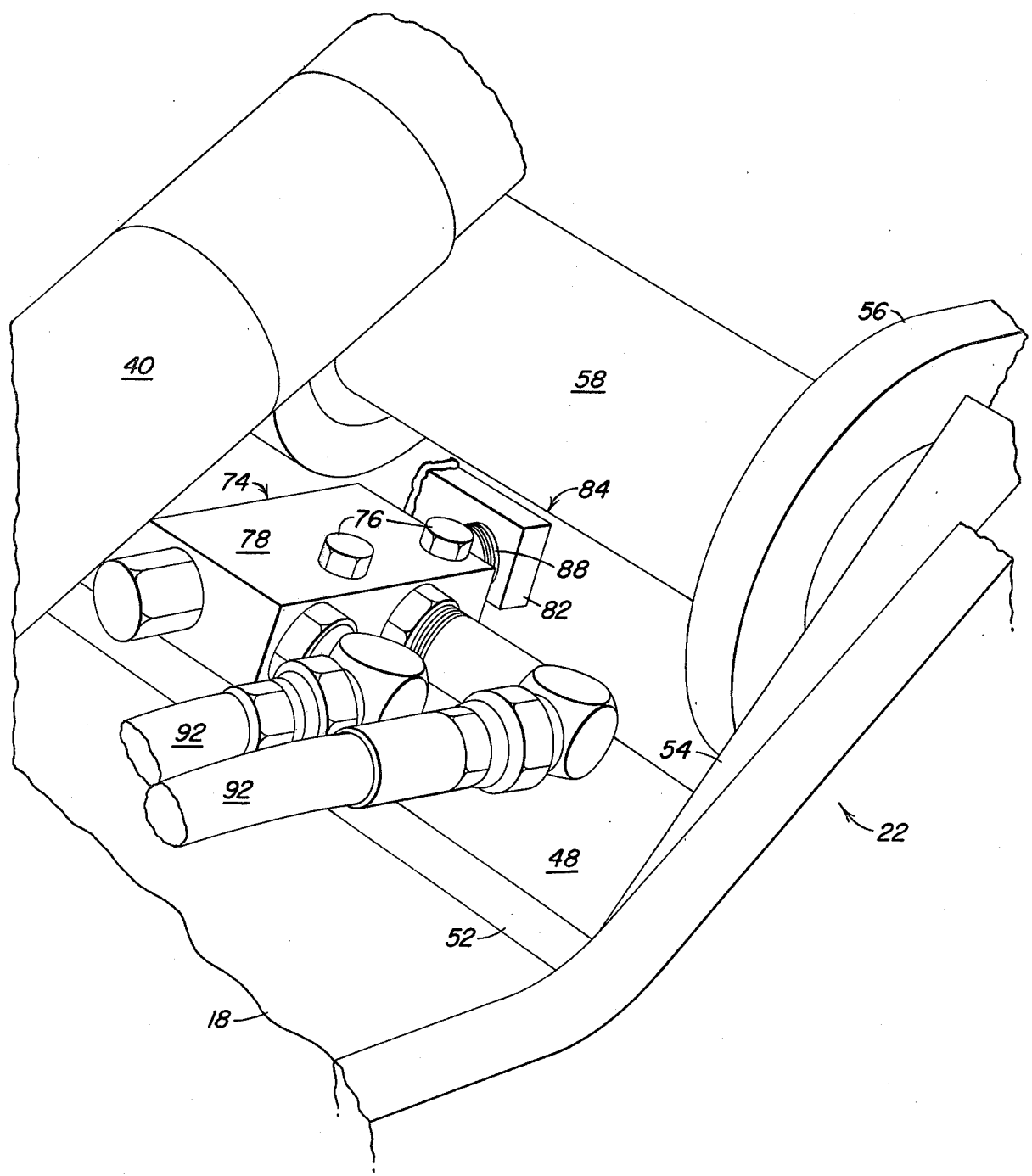
FIG. 2 is a top perspective view of the right-hand outrigger hinge area, with the outrigger in the position shown in FIG. 1a, and showing the plunger operated check valve of the present invention with the plunger depressed.

A one-way plunger operated ball check valve assembly 74 (FIGS. 2–4) is attached to the main frame 18 near the right-hand hinge 22 by a pair of bolts 76 which pass through valve body 78 and through the horizontally disposed section of the connecting portion 48. A plunger or activator 80 projects laterally outwardly from the valve body and is biased toward an extended position wherein the ball check valve is in the position shown in FIG. 4 to allow unrestricted flow to the right only. A support block 82 of a valve operating arm assembly 84 is welded or otherwise connected in a suitable manner to the inside of the outrigger side bracket 56 and carries a bolt 86. The head of the bolt 86 describes an arc as the hinge 22 rocks about the hinge pin 62. The arc intercepts the end of the plunger 80. The bolt 86 is biased toward the plunger 80 (as viewed in FIG. 2) by a spring 88 carried on the shank between the support block 82 and the head. A pair of nuts 90 (FIG. 3) are threaded on the shank to maintain the bolt 86 on the support block 82. By turning the nuts 90, the hinge position at which the plunger 80 is depressed can be adjusted. In the preferred embodiment, the bolt 86 is adjusted to maintain the plunger depressed when the outrigger 16 is in the horizontal position (FIG. 1a) to a 5° above horizontal or lifted position (FIG. 1b). The check valve 74 and the valve operating arm 84 can be added to the hinge of an existing folding toolbar to modify the fold and unfold cycle of the tool bar.

Figure 4:
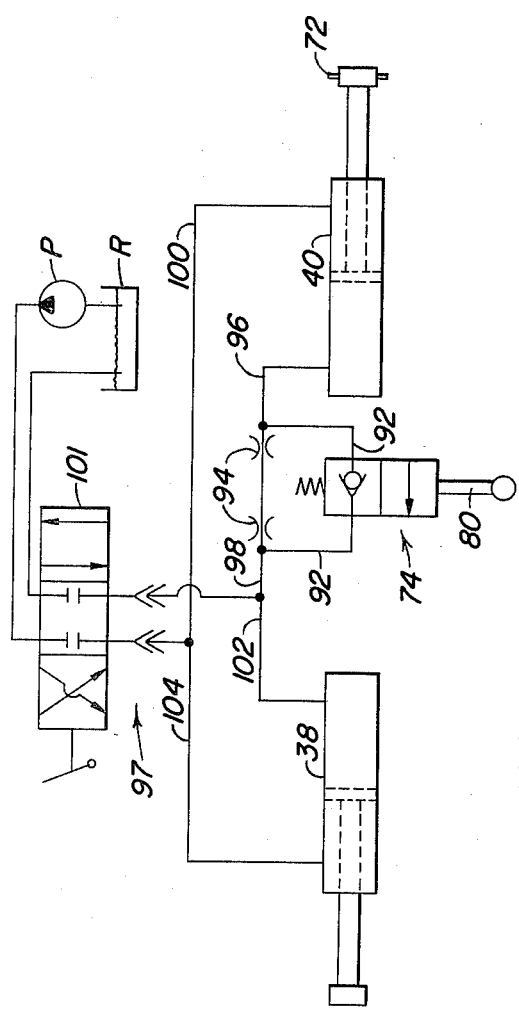
FIG. 4 is a schematic diagram of the hydraulic system.

Hydraulic line 92 connects the check valve 74 to the hydraulic circuit for the right-hand cylinder 40 as shown in FIG. 4. Two restrictors 94 are placed in series with hydraulic line 96 leading to the cylinder 40. The check valve 74 is connected in parallel with the restrictors 94. The parallel combination of the restrictors 94 and check valve 74 is connected to one port of a hydraulic outlet 97 on the tractor, or other source of hydraulic fluid, by line 98. The cylinder 40 is connected to the other port of the outlet 97 by line 100. Hydraulic fluid is selectively directed by the pump P from a reservoir R through a conventional operator control valve 101 on the tractor to extend and retract the cylinders 38 and 40. The left-hand cylinder 38 is connected to the ports, and in parallel with lines 98 and 100, by lines 102 and 104. When the plunger 80 is depressed by the valve operating arm 84, hydraulic fluid can flow freely in either direction through the valve 74 between the lines 96 and 98, bypassing the restrictors 94. When the plunger is extended, the valve is in the position shown in FIG. 4 and flow is restricted to the left from the line 96 to the line 98, but the fluid can flow freely toward the right through the check valve.

In operation, with the tool bar 12 in the position shown in FIG. 1a, the valve operating arm 84 acts against the plunger 80 to maintain the check valve 74 in the uppermost position (FIG. 4) so that hydraulic fluid can flow freely from the cylinder 40 through the lines 96 and 98, bypassing the restrictors 94. Therefore when the operator moves the valve 101 to apply hydraulic pressure to the lines 100 and 104 and retract the cylinders 38 and 40, both outriggers 14 and 16 will raise together at approximately the same rate until the arm 84 allows the plunger 80 to extend. Once the plunger 80 is extended hydraulic fluid can no longer bypass the restrictors 94 while the cylinder 40 is retracting. The bolt 86 of the arm 84 is adjusted so that the outriggers 14 and 16 will fold together during the initial portion of the fold cycle, preferably about the first 5° (FIG. 1b), to facilitate turning in the headlands. Thereafter with continued retraction of the cylinders, hydraulic fluid flow from the right-hand cylinder must pass through the restrictors 94 because of the check valve 74, thereby slowing down the folding of the right-hand outrigger 16 (FIG. 1c) so the opposite outrigger 14 reaches its folded transport position first. In the preferred embodiment, the restrictors 94 are selected such that the folding rate of the right-hand outrigger 16 will be about 0.577 times the rate of the outrigger 14 after they are folded beyond the preselected angle at which the plunger 80 is extended.

After the left-hand outrigger 14 reaches its fully folded position, which in the preferred embodiment is 180° from the field-working position, the right-hand outrigger continues to fold as the cylinder 40 is retracted until the extension 26 is in a preselected position just above or overlapping the upwardly extending shank assemblies 36 on the left-hand extension 24 (FIG. 1d). In the preferred embodiment the preselected position is about 150° from the field-working position or at an angle slightly less than the angle where interference between the extended outriggers begins to occur. A support stand 108 is mounted on the main frame 18 by a pair of U-bolt brackets 110 to prevent the outrigger 16 from pivoting beyond the desired transport position angle and to support the outrigger 16 during transport. Another support stand 112 is mounted on the main frame 18 by a single U-bolt bracket 114 to support the outrigger 14 in the 180° folded position.

To unfold the outriggers from the transport position shown in FIG. 1d to the field-working position shown in FIG. 1a, the cylinders 38 and 40 are extended by supplying fluid under pressure to the lines 102 and 96. Since the check valve 74 is one-way only, fluid can flow from the line 98 to the line 96 through the valve to bypass the restrictors 94 so both cylinders 38 and 40 will extend at approximately the same rate to unfold the outriggers 14 and 16 at the same rate. Therefore, the right-hand outrigger 16 will be out of the way of the left-hand outrigger 14 during unfolding.

The above-described hydraulic control allows extensions to be easily added to a 180° folding toolbar without extensive modifications and permits folding and unfolding of the outriggers without interference from each other. The hydraulic control permits the outriggers to be raised together during the first portion of the fold cycle for turns in the headlands.

Having described the preferred embodiment, it will be apparent that modifications can be made without departing from the scope of the invention as defined in the accompanying claims.

I claim:

1. In a foldable agricultural implement including a transversely extending main frame and first and second outriggers hingedly connected to the respective outer ends of the main frame, a hydraulic folding system comprising:
   first and second hydraulic motor means operably connected to the first and second outriggers respectively for rocking the outrigger frames between a generally horizontally and outwardly extending field-working position and a folded transport position wherein the outriggers are supported above the main frame;
   supply means for supplying hydraulic fluid to and operating the first and second motor means;
   variable rate means operably associated with the supply means for permitting the hydraulic motor means to rock the first outrigger at a faster rate than the second outrigger as the outriggers are rocked from the field-working position to the transport position so that first outrigger reaches its transport position before the second outrigger reaches its transport position, said variable rate means comprising a valve assembly connected between the supply means and one of the motor means, said valve assembly having at least a first operative condition restricting fluid flow to the second motor means relative to the first as the outriggers are rocked toward the transport position and a second operative condition permitting significantly greater fluid flow than in said first operative condition between the second motor means the supply means relative to the fluid flow between the first motor means and the supply means as the outriggers are rocked toward the field-working position.

2. The invention as set forth in claim 1 wherein in the transparent position, the first outrigger is folded approximately 180° from the horizontal field-working position and the second outrigger is folded more than 90° but less than 180° from the horizontal field-working position, and wherein the combined width of the outrigger frames is greater than the width of the main frame so that a portion of the second outrigger frame extends above and overlaps the end of the first outrigger in the transport position.

3. The invention as set forth in claim 2 wherein the variable rate means comprises means for permitting the hydraulic motor means to rock the outrigger frames from the folded transport position toward the field-working position at approximately the same rate so that the outriggers will not interfere with each other during unfolding.

4. The invention as set forth in claim 1 wherein the variable rate means comprises a check valve connected in parallel with a fluid flow restrictor and in series between the supply means and one of the hydraulic motor means.

5. The invention as set forth in claim 4 wherein said variable rate means further comprises means for permitting the hydraulic motor means to rock the first and second outriggers in unison from the field-working position to an intermediate position between the field-working and transport positions.

6. In a foldable agricultural implement including a transversely extending main frame and first and second outriggers hingedly connected to the respective outer ends of the main frame for rocking about generally fore-and-aft extending horizontal pivots, a hydraulic folding system comprising:
   first and second hydraulic cylinders operably connected between the main frame and the respective first and second outriggers for rocking the outriggers between a transversely extending field-working position and a folded transport position wherein in the transport position the outriggers are folded over the main frame at an angle relative to the horizontal field-working position of between 90° and 180°;

first and second hydraulic flow lines connected to the first and second cylinders, respectively, and to a source of hydraulic fluid for operating the hydraulic cylinders;

flow control means responsive to the position of one of the outriggers for selectively varying relative fluid flow in the two hydraulic flow lines, wherein said flow control means comprises a flow control assembly connected to at least one of the hydraulic flow lines and responsive to the angular position of at least one of the outriggers for selectively and significantly restricting flow in one of said flow lines relative to the other, said flow control assembly including first means for causing said one flow line to be free of said restricting flow therethrough for permitting the first and second cylinders to rock the outriggers at approximately the same rate from the horizontal field-working position to an intermediate position between the field-working and the transport positions wherein in said intermediate position the outriggers are angled substantially less than 90° up from the horizontal field-working position, and for further permitting the first and second cylinders to rock the outriggers at approximately the same rate as they are unfolded from the transport position toward the field-working position, and including second means causing said one flow line to have said restricting flow therethrough for permitting the first and second cylinders to rock the first outrigger at a faster rate than the second outrigger as the outriggers are folded from the intermediate position to the transport position.

7. The invention as set forth in claim 6 wherein said flow control means comprises a restrictor connected in series with the second flow line, and the first means comprises means for bypassing the restrictor as the outriggers are folded from the horizontal field-working position to the intermediate position.

8. The invention as set forth in claim 7 wherein the second means comprises a one-way check valve connected in parallel with the restrictor.

9. The invention as set forth in claim 8 wherein the check valve is a two-position check valve and includes an activator operably associated with the hinge between the main frame and said one of the outriggers such that when said outrigger is between the horizontal field-working position and the intermediate position, the check valve is in a first position wherein fluid flows freely through the valve thereby bypassing the restrictor, and such that when the outrigger is folded beyond the intermediate position, fluid flow in the direction which causes the outrigger to fold toward the transport position is checked by the valve and caused to flow through the restrictor whereas fluid flow in the opposite direction tending to unfold the outrigger toward the field-working position flows freely through the valve thereby bypassing the restrictor.

10. The invention set forth in claim 9 wherein the two-position check valve is connected to the main frame and the activator is supported adjacent the hinge, and wherein the outrigger includes an activating arm for contacting the activator when the outrigger is between the field-working and the intermediate positions.

11. The invention as set forth in claim 9 wherein the intermediate position, the angle between the main frame and the outrigger is approximately 5°.

12. In a foldable toolbar having a transversely extending main frame adapted for mounting on a vehicle for forward movement over the ground and having first and second outriggers connected by hinges for pivoting about generally fore-and-aft extending horizontal axes at opposite ends of the main frame, a folding system comprising:

first and second hydraulic motor means connected between the main frame and the respective first and second outriggers and operable for pivoting the outriggers between a transversely extending horizontal field-working position and a folded transport position;

hydraulic flow lines selectively couplable to a source of fluid under pressure and connected to the hydraulic motor means for operating the latter to pivot the outriggers;

means for varying the relative flow through the hydraulic lines in accordance with the pivotal position of the outriggers with respect to the main frame, said means comprising a multiple position valve connected between the source and one of the motor means and having a first position wherein flow to the second hydraulic motor means is restricted relative to flow to the first hydraulic motor means while the outriggers are pivoted toward the transport position to pivot the second outrigger at a rate slower than the rate at which the first hydraulic motor means pivots the first outrigger, said valve having a second position wherein the relative flow to the hydraulic motor means during pivoting of the outriggers is maintained to pivot the outriggers at a substantially equal rate, valve operating means responsive to the pivoting of one of the outriggers and operably connected to the valve for positioning the valve in the second position so that the outriggers pivot together at substantially the same rate when the outriggers are pivoted from the horizontal field-working position to an intermediate position between the field-working position and the folded transport position and positioning the valve in the first position so that the outriggers pivot at different rates when the outriggers are pivoted from the intermediate position to the transport position, thereby causing the outriggers to pivot together from the field-working position to the intermediate position and causing the first outrigger to pivot from the intermediate position to the folded position before the second outrigger reaches the folded position.

13. The invention as set forth in claim 12 wherein in the intermediate position the angle of one of the outriggers with respect to the horizontal is less than about 5 percent of the angle of the outrigger with respect to the horizontal in the folded transport position.

14. The invention as set forth in claims 12 or 13 further comprising means for supporting the end of the second outrigger above the end of the first outrigger and wherein the folded transport position the angle of the first and second outriggers with respect to the horizontal are approximately 180° and between 90° and 180°, respectively.

15. The invention as set forth in claim 12 wherein said means for varying the relative flow through the hydraulic lines also comprises a flow restrictor connected in series with the flow line to one of the hydraulic motor means and connected in parallel with the multiple position valve.

16. The invention as set forth in claims 12 or 15 wherein the means for varying the relative flow through the hydraulic lines includes means for maintaining the relative flow in the lines, during pivoting from the folded transport position toward the field-working position, to permit the outriggers to pivot at substantially equal rates.

17. The invention as set forth in claim 16 wherein said last-mentioned means comprises a check valve.

18. The invention as set forth in claims 12 or 15 wherein the valve includes a movable plunger located adjacent one of the outriggers and the valve operating means comprises arm means connected for pivoting with said one of the outriggers for moving the plunger.

19. In a foldable implement including a transverse main frame and first and second outriggers hingedly connected by generally fore-and-aft extending pivots to the respective opposite ends of the frame, a folding system comprising:
first and second extendable and retractable cylinders connected between the frame and the respective first and second outriggers and responsive to fluid flow to rock the outriggers about the pivots between a horizontally disposed unfolded field-working position and a folded transport position wherein both outriggers are folded greater than 90° from the horizontal position, first and second conduit means for providing fluid to and for extending and retracting the respective cylinders at rates dependent on the flow rates through the conduit means, a restrictor connected in series with the second conduit means for decreasing the flow rate therethrough and causing the second cylinder to rock the second outrigger at a rate less than the first cylinder rocks the first outrigger, variably positionable valve means responsive to the position of one of the outriggers for selectively bypassing the restrictor and causing the cylinders to rock the outriggers together at approximately the same rate between selected positions of one of the outriggers, wherein when said one of the outriggers is between the horizontally disposed unfolded field-working position and an intermediate position wherein the angle between the outrigger and the horizontal is less than 90° the valve means is positioned to bypass the restrictor so that the outriggers rock together between said field-working and intermediate positions, and wherein when said one of the outriggers is folded between the intermediate position and the transport position, the valve means is positioned to direct flow through the restrictor so that the second outrigger rocks more slowly than and reaches the transport position after the first outrigger.

20. The invention as set forth in claim 19 wherein the valve means includes means for bypassing the restrictor and causing the cylinders to rock the outriggers together at approximately the same rate from the folded transport position toward the intermediate position.

21. The invention as set forth in claims 19 or 20 including means for stopping and supporting the second outrigger at an angle with respect to the horizontal less than the angle of the first outrigger with respect to the horizontal in the folded transport position.

22. The invention as set forth in claim 19 wherein the cylinders have substantially identical displacement and the first and second conduit means are connected in parallel.

23. The invention as set forth in claims 19 wherein the valve means is connected in parallel with the restrictor.

24. The invention as set forth in claims 19 or 20 wherein the valve means comprises a body portion connected to the main frame adjacent said one of the outriggers, a plunger supported by the body portion, and a valve operating member connected for movement with said last-mentioned outrigger along a path which intercepts the plunger.

25. In a foldable implement including a transverse main frame, first and second outriggers hingedly connected to the main frame for pivoting approximately 180° from a horizontal field-working position wherein the outriggers extend transversely outwardly from the ends of the main frame to a folded transport position wherein the outriggers are positioned above and generally parallel to the main frame, said outriggers having a combined width less than the width of the main frame so that upon folding to the transport position the outriggers are positioned in non-interfering relationship with their outermost ends adjacent each other, hydraulic cylinders connected between the main frame and the outriggers, a source of hydraulic pressure selectively coupleable to the cylinders for operating the cylinders and pivoting the outriggers at approximately the same rate between the field-working and transport positions, and a system for widening the implement comprising:
means connectible to the outriggers for increasing their combined width so that it is greater than the width of the main frame, thereby preventing the outriggers from folding 180° together to the transport position,
valve means connectible between the source of hydraulic pressure and one of the cylinders and responsive to the pivoting of one of the outriggers for selectively restricting the hydraulic pressure to one of the cylinders to slow the rate at which the second outrigger pivots, said valve means including means for restricting the pressure to slow the second outrigger with respect to the first as the outriggers are pivoted toward the folded transport position and permitting the first outrigger to reach its 180° folded position before the second outrigger approaches its 180° folded position;
means for stopping the pivoting of the second outrigger at a preselected position wherein the angle of fold with respect to the field-working position is less than 180° and wherein a portion of the second outrigger is positioned above and in non-interfering relationship with the end of the first folded outrigger; and
wherein the valve means includes means responsive to the pivoting of the outriggers from the transport position toward the field-working position for permitting the second outrigger to pivot at a rate at least about equal to the rate at which the first outrigger pivots so that the second outrigger pivots out of the path of the first outrigger during unfolding from the transport position.

26. The invention as set forth in claim 25 wherein said valve means includes means for permitting the first and second outriggers to pivot together at approximately equal rates as the outriggers are pivoted from the horizontal field-working position to an intermediate position substantially less than 90° from the horizontal.

27. The invention as set forth in claim 26 wherein the intermediate position is approximately 5° from the horizontal.

28. The invention as set forth in claims 25 or 27 wherein, in the preselected position, the angle of fold of the second outrigger is about 150°.

29. The invention as set forth in claim 25 wherein the valve means comprises a restrictor connected in parallel with a one-way valve.

30. The invention as set forth in claim 25 wherein the valve means comprises a restrictor connected in parallel with a two-position valve controllably connected to and positionable in response to pivoting of one of the outriggers, said valve having a restrictor bypassing position when the outrigger is between the field-working and the intermediate positions.

31. In a foldable implement including a transverse main frame, first and second outriggers hingedly connected to the main frame for pivoting approximately 180° from a horizontal field-working position wherein the outriggers extend transversely outwardly from the ends of the main frame to a folded transport position wherein the outriggers are positioned above and generally parallel to the main frame, said outriggers having a combined width less than the width of the main frame so that upon folding to the transport position the outriggers are positioned in non-interfering relationship with their outermost ends adjacent each other, hydraulic cylinders connected between the main frame and the outriggers, a source of hydraulic pressure selectively couplable to the cylinders for operating the cylinders and pivoting the outriggers at approximately the same rate between the field-working and transport positions, a system for widening the implement comprising:
 first means for extending the width of the outriggers to increase the field-working width of the implement, so the combined width of the outriggers is greater than the width of the main frame so that the outriggers interfere with each other when pivoted toward the 180° transport position;
 second means connectible between the source of hydraulic pressure and one of the hydraulic cylinders and responsive to the pivotal position of one of the outriggers for varying the relative rates of operation of the cylinders, including means for pivoting the outriggers at approximately the same rate when said one of the outriggers is between the horizontal field-working position and an intermediate position wherein the outrigger is pivoted an angle substantially less than 90°, and including means for pivoting the first outrigger at a slower rate than the second outrigger when the outrigger is pivoted from the intermediate position toward the folded transport position;
 third means attachable to the implement for stopping the pivoting of the second outrigger at a preselected angle with respect to the horizontal as it is pivoted toward the 180° folded position and preventing said outrigger from interfering with the first outrigger; and
 wherein the second means comprises a multi-position valve connected in parallel with a restrictor and valve positioning means connectible for movement with said one of the outriggers for changing the position of the valve.

32. The invention as set forth in claim 31 wherein the second means includes means for permitting the first and second outriggers to pivot together at approximately the same rate from the transport position toward the field-working position.

33. The invention as set forth in claims 31 or 32 wherein the third means comprises a support for maintaining the second outrigger at the preselected angle during transport.

34. The invention as set forth in claim 33 wherein the preselected angle is slightly less than angle at which the second outrigger begins to interfere with the first outrigger in the folded transport position.

35. The invention as set forth in claim 33 wherein in the intermediate position the outriggers are pivoted about 5° from the horizontal and the preselected angle is about 150° from the horizontal.

36. In a foldable agricultural implement including a transversely extending main frame and first and second outriggers hingedly connected to the respective outer ends of the main frame for rocking about generally fore-and-aft extending horizontal pivots, a hydraulic folding system comprising:
 first and second hydraulic cylinders operably connected between the main frame and the respective first and second outriggers for rocking the outriggers between a transversely extending field-working position and a folded transport position wherein in the transport position the outriggers are folded over the main frame at an angle relative to the horizontal field-working position of between 90° and 180°;
 first and second hydraulic flow lines connected to the first and second cylinders, respectively, and to a source of hydraulic fluid for operating the hydraulic cylinders;
 flow control means responsive to the position of one of the outriggers for selectively varying relative fluid flow in the two hydraulic flow lines including first means for permitting the first and second cylinders to rock the outriggers at approximately the same rate from the horizontal field-working position to an intermediate position between the field-working and the transport positions wherein in said intermediate position the outriggers are angled substantially less than 90° up from the horizontal field-working position, and including second means for permitting the first and second cylinders to rock the first outrigger at a faster rate than the second outrigger as the outriggers are folded from the intermediate position to the transport position and permitting the first and second cylinders to rock the outriggers at approximately the same rate as they are unfolded from the transport position toward the field-working position, and wherein said flow control means comprises a restrictor connected in series with the second flow line, and the first means comprises means for bypassing the restrictor as the outriggers are folded from the horizontal field-working position to the intermediate position.

37. The invention as set forth in claim 36 wherein the second means comprises a one-way check valve connected in parallel with the restrictor.

38. The invention as set forth in claim 37 wherein the valve is a two-position check valve and includes an activator operably associated with the hinge between the main frame and said one of the outriggers such that when said outrigger is between the horizontal field-working position and the intermediate position, the check valve is in a first position wherein fluid flows freely through the valve thereby bypassing the restrictor, and such that when the outrigger is folded beyond the intermediate position, fluid flow in the direction which causes the outrigger to fold toward the transport position is checked by the valve and caused to flow through the restrictor whereas fluid flow in the opposite direction tending to unfold the outrigger toward the field-working position flows freely through the valve thereby bypassing the restrictor.

39. The invention set forth in claim 38 wherein the two-position check valve is connected to the main frame and the activator is supported adjacent the hinge, and wherein the outrigger includes an activating arm for contacting the activator when the outrigger is between the field-working and the intermediate positions.

40. The invention as set forth in claim 38 wherein in the intermediate position, the angle between the main frame and the outrigger is approximately 5°.

* * * * *

UNITED STATES PATENT AND TRADEMARK OFFICE
CERTIFICATE OF CORRECTION

PATENT NO. : 4,320,805

DATED : 23 March 1982

INVENTOR(S) : David C. Winter

It is certified that error appears in the above-identified patent and that said Letters Patent is hereby corrected as shown below:

Column 6, line 24, after "means", insert -- and --; line 30, delete "transparent" and insert -- transport --.

Column 8, line 62, after "wherein", insert -- in --.

Column 10, line 5, delete "claims" and insert -- claim --.

Signed and Sealed this

Twenty-third Day of November 1982

[SEAL]

Attest:

GERALD J. MOSSINGHOFF

Attesting Officer         Commissioner of Patents and Trademarks